(12) United States Patent
Davis

(10) Patent No.: US 11,651,182 B2
(45) Date of Patent: May 16, 2023

(54) CARDS AND DOCUMENTS

(71) Applicant: Mileke Armein Davis, Lithonia, GA (US)

(72) Inventor: Mileke Armein Davis, Lithonia, GA (US)

( * ) Notice: Subject to any disclaimer, the term of this patent is extended or adjusted under 35 U.S.C. 154(b) by 0 days.

(21) Appl. No.: 16/527,623

(22) Filed: Jul. 31, 2019

(65) Prior Publication Data

US 2021/0034940 A1    Feb. 4, 2021

(51) Int. Cl.
*G06K 19/07* (2006.01)
*G06Q 20/34* (2012.01)

(52) U.S. Cl.
CPC ..... *G06K 19/0725* (2013.01); *G06Q 20/3572* (2013.01)

(58) Field of Classification Search
None
See application file for complete search history.

(56) References Cited

U.S. PATENT DOCUMENTS

| | | | | |
|---|---|---|---|---|
| 4,736,094 A * | 4/1988 | Yoshida | ............... | G06Q 20/105 235/380 |
| 5,590,038 A * | 12/1996 | Pitroda | ............... | G06Q 20/4093 705/41 |
| 7,013,365 B2 * | 3/2006 | Arnouse | ............... | G06Q 20/341 711/115 |
| 7,172,112 B2 * | 2/2007 | Bonalle | ............... | G06Q 20/00 235/379 |
| 7,357,312 B2 * | 4/2008 | Gangi | ............... | G06Q 20/383 235/380 |
| 7,594,611 B1 * | 9/2009 | Arrington, III | ....... | G06Q 20/341 235/487 |
| 7,860,789 B2 * | 12/2010 | Hirka | ............... | G06Q 20/04 705/39 |
| 10,185,955 B1 * | 1/2019 | Koeppel | ............... | G06Q 20/3674 |
| RE47,248 E * | 2/2019 | Cai | ............... | G07F 7/0886 |
| 2012/0091199 A1 * | 4/2012 | Talker | ............... | G06Q 20/40145 235/380 |
| 2015/0262052 A1 * | 9/2015 | Pahuja | ............... | G06Q 20/40145 340/10.52 |

* cited by examiner

*Primary Examiner* — Kristy A Haupt
(74) *Attorney, Agent, or Firm* — Charlena Thorpe, Esq.; Incorporating Innovation LLC

(57) ABSTRACT

One 16 digits smart card shaped like a regular bank card in length and width with chip and swiping abilities which is divided into several different separate sectors. e.g. bank cards, credit cards, cash transactions, medical insurance usage and other personal documentation of information that are all stored on one smart card. This smart card is configured to hold financial information, general information, and documentation of a variety of various categories of different documents on its database. All parts can be accessible by one four-digit secret security code to ensure the safety of the card's information.

1 Claim, No Drawings

CARDS AND DOCUMENTS

TECHNICAL FIELD

This disclosure relates to implementations of a smart card.

BACKGROUND

People typically have to carry multiple documents and cards from multiple sources. This can be unmanageable.

BRIEF DESCRIPTION OF THE DRAWINGS

FIG. 1 illustrates an example implementation of a smart card according to the resent disclosure.

DETAILED DESCRIPTION

In some implementations, one single smart card for multiple uses which has a number of separate areas that are accessed by one code is provided. As illustrated in FIG. 1, the digital wallet card looks, appears, and is shaped just like a smart card or bank card and provides digital information storage. The card can access several bank cards, credit cards, drivers' license and other personal documentation or identification information. This card eliminates the need to carry multiple transaction cards or documents on one's self like ID card, insurance information, or birth certificate. Instead, all of the person's documents, transaction account information, and documents like medical information are available on one digital wallet card. Authentic copies of documents can be added to a card's chip.

In some implementations, there is provided a smart card made for multiple functions in which it is divided into different sectors (e.g. credit card and bank card transactions and medical insurance). A database of general information, documentation, and identification is combined on one chip card. This all in one card system meets maximum security and is easy to use requiring minimum effort to use on a daily basis. A single cipher or pin ensures the safety of the valuable information stored on the card. A customer can make up his/her corresponding secret number due to loss or theft so that no one will be able to receive information from the card except the customer. If the pin is entered incorrectly three times the card will lock automatically. If the customer happens to forget their four digit code, they can call their provider with answering security questions needed to gain access to their card again. This single smart card will work like a phone card and will connect to the provider only which makes it a safe card to have.

In some implementations, with this smart card and card reader, not only cashless payments can be accomplished but healthcare information of a patient's data like allergy and blood type can be added on cards chip. Also, driver's license birth certificate, social security number and any other documentation can be read on the cards chip. With this smart card carrying around multiple document and bank cards will cease to exist.

With the digital wallet card solution of the present disclosure, the chip will have the entire person's information and a four digit code will need to be entered to access the card information. People won't have to carry multiple documents and stacks of cards ever again. Users of this card can add other information, documentation, identifications and bank cards information that they desire inside of this digital memory storage smart card. Below is a list of things one card will offer and other documents, information, and documentation can always be added.

1. Drivers license/permit
2. Picture LD-Identification
3. Social security card/number
4. Birth certificate
5. Complete Medical History (Illness & Blood Type etc.)
6. Medical Insurances
7. Medical reports
8. Medical test results
9. Prescription records
10. Life Insurance information
11. Car Insurance information
12. Home Insurance
13. Vehicle registration
14. Credit Card
15. Bank Card
16. Diploma & transcript
17. Educational credentials & Degrees
18. State & federal professional license & Number
19. Credit Scores & History
20. Payment vouchers
21. passports
22. marriage certificates
23. military discharge records
24. fingerprint records
25. membership cards
26. numbers & serial numbers
27. stock shares & bonds
28. any evidence of verifications
29. tax returns
30. deed for land
31. car title
32. financial reports
33. certificates of inspections
34. account statements
35. E-voting over internet
36. Voters I.D.
37. Pilot license
38. Cosmetology license
39. Hazmat & explosives (ATF) license
40. Any other documents can be added later.

In featuring "Cards and Documents" I will show the distinctive features, concepts of the product, and the need it will fulfill for society. This invention is a proposed "Digital Wallet" that looks, appears, and shaped just like a smart card or bank card which can provide digital information storage which can access several bank cards, credit cards, drivers' license and other personal documentation or identification information and more. Having this card will eliminate the need to carry multiple transaction cards or documents on one's self like ID card, insurance information, or birth certificate. Instead, all of the person's documents, transaction account information, and documents like medical information would be available on one digital wallet card.

To use, access, or enable this card a 4-digit security code would need to be used for transaction payments, identification, or documentation. An (POS) transaction machine would be needed for retailers to process transactions due to this new digital wallet of multiple card use and document system use. This card will operate just like all bank cards with a swipe or using the chip in the card to pull up all information needed by scanning it. If transactions are needed for the "Cards & Documents" card online or over a phone just punch in the sixteen digit card numbers on the card just like any other card. Other companion (POS) systems or equipment may be needed for documentation or information access for the card.

This electronic wallet card will combine multiple card accounts and documentation for ease of everyday carrying situations of many cards on one's possession. This all in one secure transaction, identity, and documentation card will have capabilities to allow online transactions and access, digital transactions with microprocessor-based smart card solutions. Retailers and other entities will be able to access information documentation, identifications and bank card transaction information stored in card.

Manufacturing this card may consist of Ball Grid Array (BGA), Fine Ball Grid Array (FBGA) with embedded passive technologies. The card insides and outer parts can also contain IPX67 and IPX57 for a more quality and performance of the card, store machine readers will be able to access card information from the "Cards & Document" smart card. If this product happens to requires packaging, it will require protection of card information when sending to customers. This card will bring convenience to the economy or society. The card can come in multiple colors and a four color process along with decorations, pictures and a company's brand mark or logo at the top of the card which will show quality and ownership.

The invention claimed is:

1. A computer implemented method of using a smart card system comprising a non-government-issued identity card sized and shaped like a bank card and having storage embedded therein, wherein the non-government-issued identity card is not a government-issued identity card, and wherein the non-government-issued identity card has an associated number identifying the card wherein the number is printed on the card, the smart card system further comprising a card reader configured to retrieve information stored on the non-government-issued identity card and a storage device accessible over a network, the method comprising:

storing authenticated copies of government issued identity documents and medical information on the storage device;

receiving over a network the number identifying the non-government-issued identity card;

retrieving at least one of the authenticated copies of government issued identity documents or medical information from the storage device using the number identifying the non-government-issued identity card;

storing a plurality of authenticated copies of government issued identity documents on the non-government-issued identity card;

storing authenticated information from a plurality of financial accounts on the;

storing authenticated medical information on the card;

verifying identity using at least one of the authenticated copies of government issued identity documents stored on the non-government-issued identity card at a card reader in a first transaction requiring identity verification by retrieving the at least one of the authenticated copies of government issued identity documents using the card reader;

using the card at a card reader in a second transaction requiring payment to make a payment by retrieving information from at least one of the financial accounts stored on the non-government-issued identity card; and verifying medical information using the authenticated medical information stored on the non-government-issued identity card at a card reader in a third transaction by retrieving authenticated medical information stored on the non-government-issued identity card using the card reader.

\* \* \* \* \*